US007656884B1

(12) United States Patent
DeSanti (10) Patent No.: US 7,656,884 B1
(45) Date of Patent: Feb. 2, 2010

(54) APPARATUS AND METHOD FOR A GENERIC SERVICE LOCKING MECHANISM FOR A FIBRE CHANNEL SWITCHING FABRIC OF A STORAGE AREA NETWORK

(75) Inventor: Claudio DeSanti, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1631 days.

(21) Appl. No.: 10/155,919

(22) Filed: May 24, 2002

(51) Int. Cl.
*H04L 12/28* (2006.01)
(52) U.S. Cl. .................................. 370/401; 370/360
(58) Field of Classification Search ................ 370/389,
370/230, 299, 254, 373, 384, 386, 395.3,
370/400–402, 242, 252, 258, 392, 396, 405,
370/426, 250, 218, 229, 244, 304, 360, 367,
370/377; 709/212, 210, 217, 220, 223; 710/1,
710/33, 36
See application file for complete search history.

(56) References Cited

U.S. PATENT DOCUMENTS 6,785,742 B1 *  8/2004  Teow et al. ................... 710/1
6,898,184 B1 *  5/2005  Anderson et al. ........... 370/241
6,971,016 B1 * 11/2005  Barnett ........................ 713/182
2002/0161955 A1 * 10/2002  Beukema et al. ............ 710/200
2003/0118053 A1 *  6/2003  Edsall et al. ................. 370/474
2003/0142628 A1 *  7/2003  Alonso et al. ............... 370/241

OTHER PUBLICATIONS

"Fibre Channel Switch Fabric-2 (FC-SW-2)", NCITS working draft, Jun. 26, 2001.
Fibre Channel Generic Services-3 (FC-GS-3), NCITS working draft, Nov. 28, 2000.

* cited by examiner

*Primary Examiner*—Brenda Pham
(74) *Attorney, Agent, or Firm*—Weaver Austin Villeneuve & Sampson LLP (57) ABSTRACT

An apparatus and method for a Generic Service locking mechanism that enables a Host to lock the Fibre Channel Switching Fabric of a storage area network while applying changes across the Switching Fabric of the network is disclosed. The apparatus includes a network interface configured to send and receive Fibre Channel frames across the Fabric, a session element, responsive to the network interface, and configured to establish sessions with the Fabric; and a locking element configured issue commands to establish a lock over the Fabric so that replicated information across the Fabric can be consistently updated when the session element establishes a session with the Fabric. In one embodiment of the invention, the network interface, session element and the locking element are all implemented on each Switch of the Fabric.

34 Claims, 8 Drawing Sheets

APPARATUS AND METHOD FOR A GENERIC SERVICE LOCKING MECHANISM FOR A FIBRE CHANNEL SWITCHING FABRIC OF A STORAGE AREA NETWORK

BACKGROUND OF THE INVENTION

1. Field of the Invention

The present invention relates to storage area networks, and more particularly, to an apparatus and method for a Generic Service locking mechanism that enables a Host to lock the Fibre Channel Switching Fabric of a storage area network so that the Host may implement changes across the Switching Fabric.

2. Background of the Invention

With the increasing popularity of Internet commerce and network centric computing, businesses and other organizations are becoming more and more reliant on information. To handle all of this data, storage area networks or SANs have become very popular. A SAN typically includes a number of storage devices, a plurality of Hosts, and a number of Switches arranged in a Switching Fabric that connects the storage devices and the Hosts.

Most SANs rely on the Fibre Channel protocol for communication within the Fabric. For a detailed explanation of the Fibre Channel protocol and Fibre Channel Switching Fabrics and Services, see the Fibre Channel Framing and Signaling Standard, Rev 1.70, American National Standard of Accredited Standards Committee (NCITS), Feb. 8, 2002, and the Fibre Channel Switch Fabric-2, Rev. 5.4, NCITS, Jun. 26, 2001, and the Fibre Channel Generic Services-3, Rev. 7.01, NCITS, Nov. 28, 2000, all incorporated by reference herein for all purposes.

In Fibre Channel, each device (Hosts, storage devices and Switches) is identified by an unique eight (8) byte wide Node_Name assigned by the manufacturer. When the Fibre Channel devices are interconnected to form a SAN, the Node_Name (along with other parameters) is used to identify each device. Fibre Channel frames are used for communication among the devices in the SAN. The Node_Name, however, is not used by the frames. Instead the Fibre Channel Port of each end device (Hosts and storage devices) is addressed via a three (3) byte Fibre Channel address (or FC_ID), allocated dynamically to the end devices by the Fabric.

Fibre Channel based SANs are often organized into zones. Within each zone, Hosts can see and access only storage devices or other Hosts belonging to that zone. This allows the coexistence on the same SAN of different computing environments. For example, it is possible to define on a SAN a Unix zone and a separate Windows zone. Unix servers belonging to the Unix zone may access only storage or Hosts devices within the Unix zone, and do not interfere with the other devices connected to the SAN. In the same manner, Windows servers belonging to the Windows zone may access storage or Hosts devices only within the Windows zone, without interfering with the other devices connected to the SAN. The SAN administrator may define in a SAN multiple zones, as required or dictated by the computing and storage resources connected to it. The Switching Fabric allows communications only between devices belonging to the same zone, preventing a device of one zone from seeing or accessing a device of another zone.

Zone administration is a significant aspect of maintaining a complex SAN. Whenever the needs of the SAN change, the administrator has to modify or redefine the zone structure enforced by the Fabric. For example, this may happen when a device is added to the SAN or removed from it, or when a specific device, such as a tape drive, has to be accessed by different Hosts at different times. Typically, the administrator accomplishes the administration task using a management application running over one of the Hosts connected to the SAN. The management application sends requests to a generic function provided by the Fibre Channel Fabric called "Management Service", which enables the management of the entire Fabric.

The standard that provides the framework for this logical interaction between a Host and the entire Fabric is FC-GS-3. This standard defines a protocol, called the Common Transport (CT), required to exchange information between a Host and the various logical functions provided by the Fabric. Each logical function is called a Generic Service (GS) and is identified by using a "well known" Fibre Channel address in the Fibre Channel frames. As an example, if a Host transmits Fibre Channel frames with a destination address equal to hex'FFFFFA' or hex'FFFFFC', these frames will be delivered respectively to the Management Service or to the Directory Service functions of the Fabric. These Services may respond to the Host according to the requests that they received.

Typically, the FC-GS-3 protocols and functions are implemented in software running on the Hosts and corresponding software running on the various Switches of the Fabric. Within each GS Service, there may be various server subtypes. As an example, within the Directory Service there are two standard server subtypes: the Name Server, used to resolve FC Names in FC addresses, and the IP Address Server, used to resolve IP addresses (used by the Internet Protocol packets) into FC Names or addresses. Of interest, within the Management Service, there are server subtypes associated with Fabric management (the Fabric Configuration Server) and with zones management (the Fabric Zone Server). A specific field in the CT protocol uniquely identifies to which subserver is directed a FC frame addressed to a certain Service. Thus, the SAN administrator is able to manage and configure zones in the Fabric through a Common Transport communication between the management application and the Fabric Zone Server. FC-GS-3 defines a set of CT requests to define, modify, remove, or enforce zones.

Inside the Fabric, each Switch has to process the zone configuration data to enforce the rules that make sure that Hosts and storage devices in a zone can see and access only the Hosts and disks in that zone. To accomplish this, each Switch in the Fabric maintains a zone database that lists which Hosts can access which storage devices in the Fabric. The Switch-to-Switch interactions required to ensure that each Switch has a consistent version of this information are defined in the FC-SW-2 standard.

To update or change a zone configuration within a Fabric, FC-SW-2 defines the Zone Change Protocol. With this protocol, the Switch that wishes to propagate its zoning configuration over the other Switches of the Fabric is called the "managing Switch", while the others are called "managed Switches". Typically, the managing Switch is the Switch that received an updated zoning configuration from a management application via the GS mechanism described above. The Zone Change Protocol implements a four step process to distribute a zone change across the Switching Fabric. In general terms, the managing Switch locks the other Switches of the Fabric (step 1); propagates the changes across the Fabric to the other Switches (step 2); commits those changes (step 3); and then releases the lock on the Fabric (step 4).

Specifically the zone change protocol defines four class F frame sequences: Acquire Change Authorization (ACA); Stage Fabric Configuration (SFC); Update Fabric Configuration (UFC); and Release Change Authorization (RCA). The Switch that is trying to act as the managing Switch begins the protocol by sending an ACA sequence to all the other Switches in the Fabric. If one or more Switches reject the ACA request, then there is another Switch in the Fabric that is trying to lock the Fabric at the same time. In this situation, the protocol is aborted and the Switches that tried to become the managing Switch release the lock on the Switches that accepted their ACA request by sending them an RCA sequence. On the other hand, if all the Switches accept the request, then the Switch that initiated the process locks the Fabric and becomes the managing Switch. At this point, the managing Switch sends to each managed Switch an SFC sequence, containing the new zoning configuration. Each managed Switch checks its zone database to determine if the new zoning configuration can be supported. If a managed Switch can not support the change, a reject message is sent to the managing Switch and the zone change protocol is aborted by the managing Switch by sending an RCA to the managed Switches. If on the other hand the new zoning configuration can be supported, an accept is sent by all of the managed Switches to the managing Switch. In this case, the managing Switch asks the managed Switches to implement the new zoning configuration, by sending to each of them the UFC sequence. On receiving the UFC sequence, the managed Switches implement the requested change and update their zone databases respectively. The managed Switches then send out an accept when the update is completed. When the managing Switch receives all the accepts, then it releases the lock on the Fabric by sending to the managed Switches the RCA sequence. The Fabric is considered no longer locked when all the accepts of the RCAs has been collected by the managing Switch. In this manner, zone changes across the Fabric of a Fibre Channel based SAN can be made.

Several mechanisms are missing from the FC-GS-3 and FC-SW-2 standards. In particular no specification exists to relate the management actions performed by an administrator through the FC-GS-3 services with the Switch-to-Switch interactions defined in FC-SW-2. Further FC-GS-3 does not define today any mechanism to lock a Service, enabling the serialization of the management access to that Service. Thus, two administrators running two management applications connected to two different Switches of the same Fabric may manage the Fabric at the same time, often resulting in unpredictable results. Furthermore, FC-GS-3 defines other Services different from zoning which suffer from the same problem, the lack of a generic locking mechanism at the Service level. Since these services are based on a database replicated over all the Switches of the Fabric, it is difficult to manage the consistency of the various database copies and to implement the service across the Fabric without a locking mechanism.

An apparatus and method for a Generic Service locking mechanism for a Fibre Channel Switching Fabric of a storage area network is therefore needed.

SUMMARY OF THE INVENTION

To achieve the foregoing, and in accordance with the purpose of the present invention, an apparatus and method for a Generic Service locking mechanism that enables a Host to lock the Fibre Channel Switching Fabric of a storage area network while applying changes across the Switching Fabric of the network is disclosed. The apparatus includes a network interface configured to send and receive Fibre Channel frames across the Fabric, a session element, responsive to the network interface, and configured to establish sessions with the Fabric, and a locking element configured to issue commands to establish a lock over the Fabric so that replicated information across the Fabric can be consistently updated when the session element establishes a session with the Fabric. In one embodiment of the invention, the network interface, session element and the locking element are all implemented on each Switch of the Fabric. During operation, when a Host would like to make a change to the Switching Fabric, the Host initiates a session with one of the Switches in the Fabric. When the session is established, the locking mechanism on the Switch locks the Fabric. The Switch handling the session is designated as the managing Switch and all the other Switches in the Fabric are designated as managed Switches. The change requests issued by the Host are then implemented across the Fabric by the managing Switch using a series of Switch-to-Switch commands to propagate the changes across the Fabric. When the propagation of the changes is complete, the session is ended and the lock is removed from the Switching Fabric. In this manner, a Host can lock the Fabric or a particular Service or subserver as defined by the Generic Service protocol, enabling the serialization of the management access to that Service or subserver. In various embodiments of the invention, the entity that is changed during the lock can be any type of entity that is replicated across the Fibre Channel Switching Fabric of a SAN, for example databases for zone management, Fabric management, security services, authentication services, or authorization services.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 1:
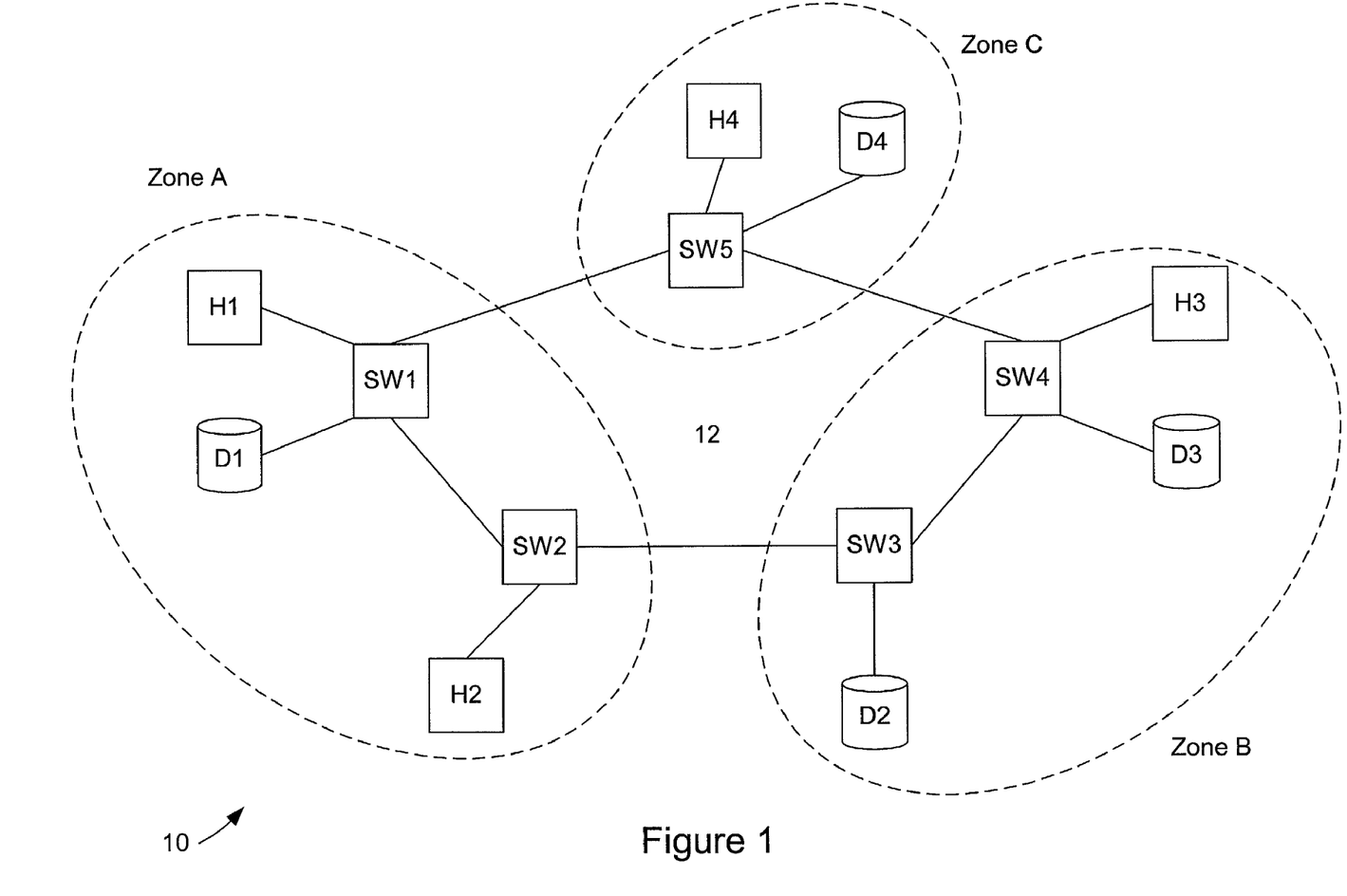
FIG. 1 is a Fibre Channel Switching Fabric of a storage area network.

Referring to FIG. 1, a Fibre Channel Switching Fabric of a storage area network is shown. The storage area network (SAN) 10 includes a Switching Fabric 12 that includes a plurality of Fibre Channel Switches SW1 through SW5. Also included in the SAN 10 are a plurality of Hosts H1 through H4 and a plurality of storage devices D1 through D4. According to various embodiments of the invention, the Hosts can be any type of Host including but not limited to servers or personal computers running on either the Unix, Windows or any other computing platform. Similarly, the storage devices D1-D4 can be any type of storage device including but not limited to tape back-up systems, emulated tape back-up systems, CD-ROM storage arrays, or one or more disks such as a Redundant Array of Independent Disks (RAID). The Switches SW1-SW5 can be any type of Fibre Channel Switch such as those commercially available from Brocade of San Jose, Calif. or Andiamo Systems, the assignee of the present application.

As depicted in FIG. 1, the Hosts H and storage devices D are arranged into three zones. The members of zone A include Hosts H1 and H2 and storage disk D1. The members of zone B include Host H3 and storage devices D2 and D3. The members of zone C include Host H4 and storage device D4. The individual zones are typically defined on the basis of the Operating Systems used, and so they can be either Unix zones, Windows zones, or some other type of computing platform zone, but they can be defined also on the basis of other requirements. Although not depicted herein, zones can also overlap with one another. It should be noted that the number and types of Hosts H, storage devices D, and Switches SW and their particular arrangement in the zones as shown is merely illustrative of a SAN array. In no way should this example be construed as limiting the invention.

The Hosts H and Switches SW contain software that interfaces with the Fabric 12 and implements the Common Transport (CT) protocol used to access the Generic Services of Fibre Channel as noted above. With the present invention, this software has been modified to provide the CT protocol with a locking mechanism available to the Hosts H. This is accomplished by a series of CT commands between the Host H that invokes the locking mechanism and the Switching Fabric 12. By using these commands, the invoking Host H is able to establish a session with a Generic Service, identified by a well known Fibre Channel address. The Switch that terminates these requests (normally the Switch directly attached to the Host) becomes the managing Switch of the Fabric 12, sending the ACA requests and locking the Fabric 12. It should be noted that in alternative embodiments, the CT protocol including the locking mechanism can be implemented on the Switch in hardware, or in a combination of hardware and software. Similarly, the Host includes software, hardware, or a combination thereof, to initiate sessions and locks with the terminating Switch.

Once the session is established, the Host H maintains a lock on the Fabric 12 that prevents other Hosts from locking the Fabric. In another embodiment, the Host H maintains a lock on the particular Generic Service addressed that prevents other Hosts from locking that particular Service. In another embodiment, the Host H maintains a lock on a selected subserver within the particular Generic Service addressed that prevents other Hosts from locking that selected subserver within that particular Service. The Acquire Change Authorization (ACA) and Release Change Authorization (RCA) sequences defined in FC-SW-2 allow to lock only the entire Fabric, because they do not convey any information about the Service or the subserver within a Service to be locked. Also the Stage Fabric Configuration (SFC) and Update Fabric Configuration (UFC) sequences defined in FC-SW-2 do not convey any information about the Service or subserver to be updated. The latter two embodiments require to define generalized ACA and RCA sequences, to convey with them the information about the Service or the subserver within the Service which has to be locked, and also generalized SFC and UFC sequences, to convey with them the information about the Service or subserver within the Service which has to be updated. In all cases, the locking Host is allowed to implement consistent changes across the Fabric 12. The changes are implemented by a series of CT requests between the Host and a selected subserver within a Generic Service, identified by a well known Fibre Channel address. On request by the Host H, via the Commit (CMIT) CT request, the managing Switch generates Switch-to-Switch commands to the other managed Switches to implement the changes across the Fabric. Thus the present invention provides a consistency mechanism which enables the Host to update and maintain consistency among any replicated entity associated with the Switches of the Fabric 12 respectively. Examples of such replicated entities include but are not limited to zone databases, Fabric configuration databases, security service databases, authentication service databases, authorization services databases or any other management or configuration database. For the sake of illustration, the present invention is described below using the replicated entity of a zone database. It should be made clear, however, that this example should in no way be limiting and the present invention applies to any Generic Service accessed with the CT protocol.

Referring to FIGS. 2A-2D, a flow chart illustrating the Generic Service locking mechanism that enables a Host to lock the Fibre Channel Switching Fabric or a particular Generic Service or a selected subserver within a Generic Service is shown. Initially referring to FIG. 2A, when a Host wishes to lock the Fabric, or a Service, or a subserver, (box 20), the Host generates a Server Session Begin (SSB) CT request to a selected subserver within a specific Service (box 22). In response, the Switch handling the SSB CT request attempts to become the managing Switch of the Fabric by generating an ACA or a generalized ACA sequence to all other Switches in the Fabric. As depicted in decision diamond 26 and in box 23 and 25, if the ACA sequences are not accepted by all the Switches, then an RCA or generalized RCA sequence is sent to the Switches that accepted the ACA, and a SSB CT reject is returned to the Host. The Host may try to lock the Fabric or service again at a later time, restarting the process from box 20. On the other hand, if all the Switches accept (SW_ACC) the ACA sequence, then the Switch handling the SSB CT request becomes the managing Switch of the Fabric and creates a working copy of the operational database associated with the selected subserver functionality (box 27). Additionally, as depicted in box 28, the selected subserver residing over that Switch sends an SSB CT accept to the Host that initiated the request. The above defined sequence thus defines what occurs when the Generic Service locking mechanism is invoked from both the point of view of the Host and the Fabric. The Host requests a lock trying to establish a session with the Fabric or Service or subserver by sending the SSB CT request. In the case the session is successfully established, the Switch handling the SSB CT request becomes the Managing Switch of the Fabric and creates a working copy of the operational database (box 27), and the Host receives an SSB CT accept message (box 28). On the other hand if the session establishment is unsuccessful, the Switch handling the SSB CT request does not become the Managing Switch (box 23) and the Host receives an SSB CT reject message (box 25).

Figure 2A:
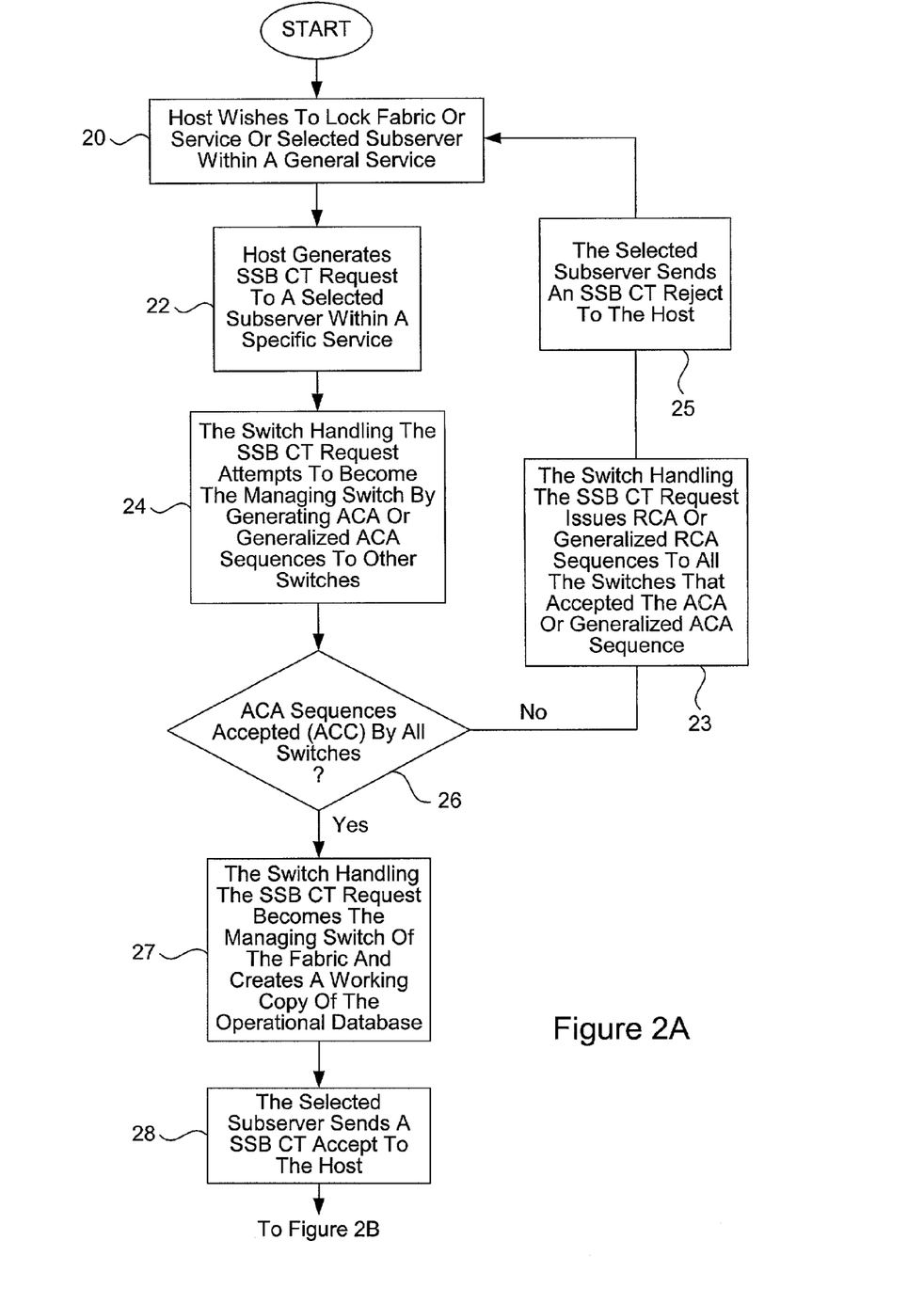
FIGS. 2A-2D is a flowchart illustrating the sequence of the Host locking mechanism of the present invention.
Figure 2B:
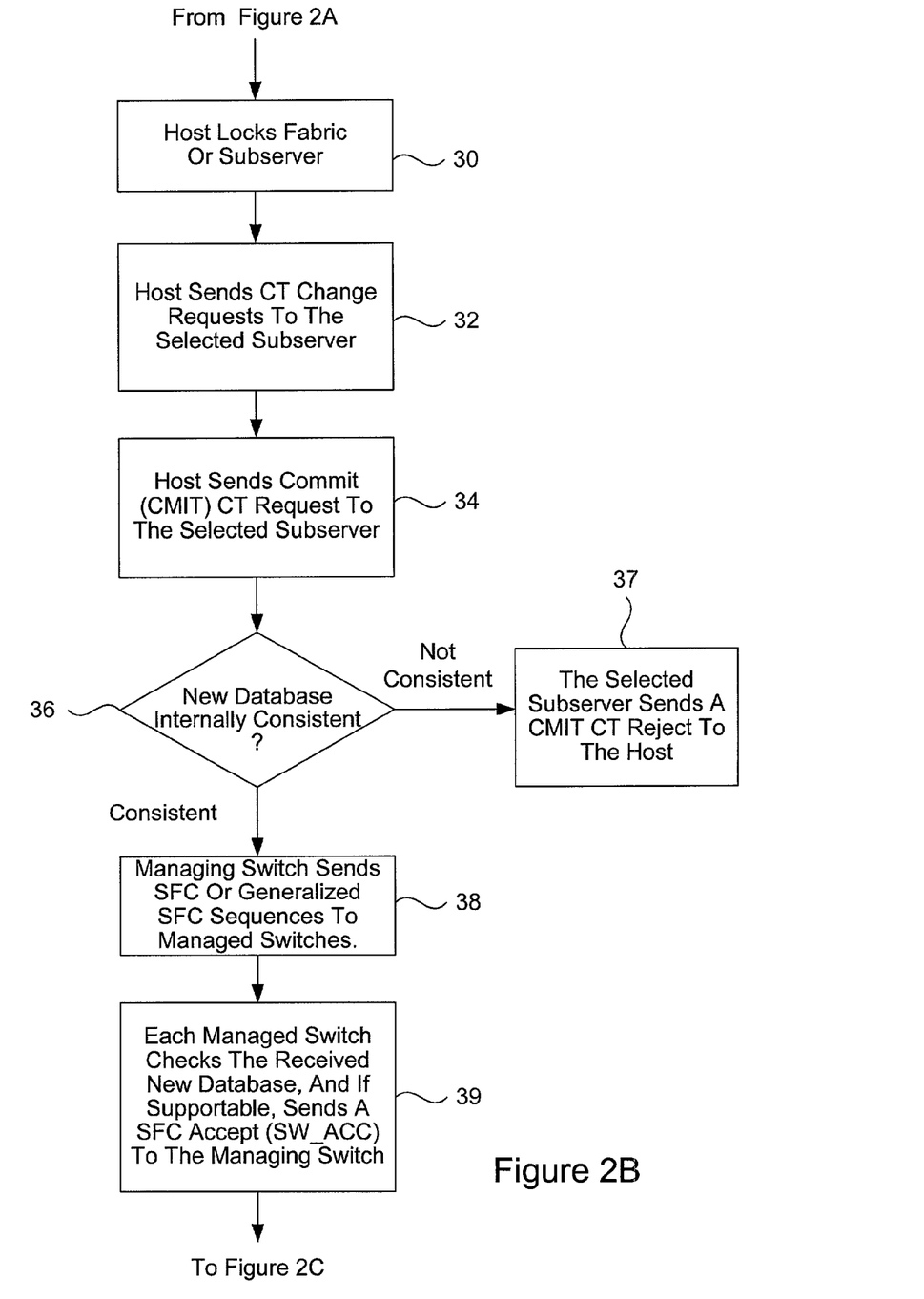

Referring to FIG. 2B, the Host locks the Fabric or Service or subserver if an SSB CT accept is received from the selected subserver. Next the Host is allowed to send CT change requests to the locked subserver (box 32). With these requests the Host can create new structures, or modify or remove existing structures. As an example, for the case of the zone database, the Host can create new zones, add or delete members from certain zones, or remove some zones. These requests are handled by the selected subserver residing over the managing Switch and applied against the working copy of the database. When the Host completed the changes, it issues a Commit (CMIT) CT request to the selected subserver (box 34), in this manner asking to apply the changes over the entire Fabric. In decision diamond 36, the selected subserver determines if the updated working database is internally consistent (i.e, there are not dangling references or incomplete definitions). If not then the selected subserver issues a CMIT CT reject response to the Host (box 37). The Host can then send other change CT requests to the selected subserver (returning to box 32), to try to reach a consistent new database, or abort the update process by removing the lock over the Fabric or Service or subserver, going to box 50. If the updated working database is internally consistent, then it can be distributed over the Fabric. The managing Switch distributes the new database by issuing SFC sequences to the managed Switches (box 38). The managed Switches create a working database from the data received in the SFC sequence and check the working database to determine if they are able to support the new configuration (box 39). As an example, for the zone database, each managed Switch verifies if it has enough resources to enforce the new received zoning configuration. If a managed Switch is able to support the new database, then it sends an SFC accept (SW_ACC) to the managing Switch, otherwise it sends an SFC reject (SW_RJT).

Figure 2C:
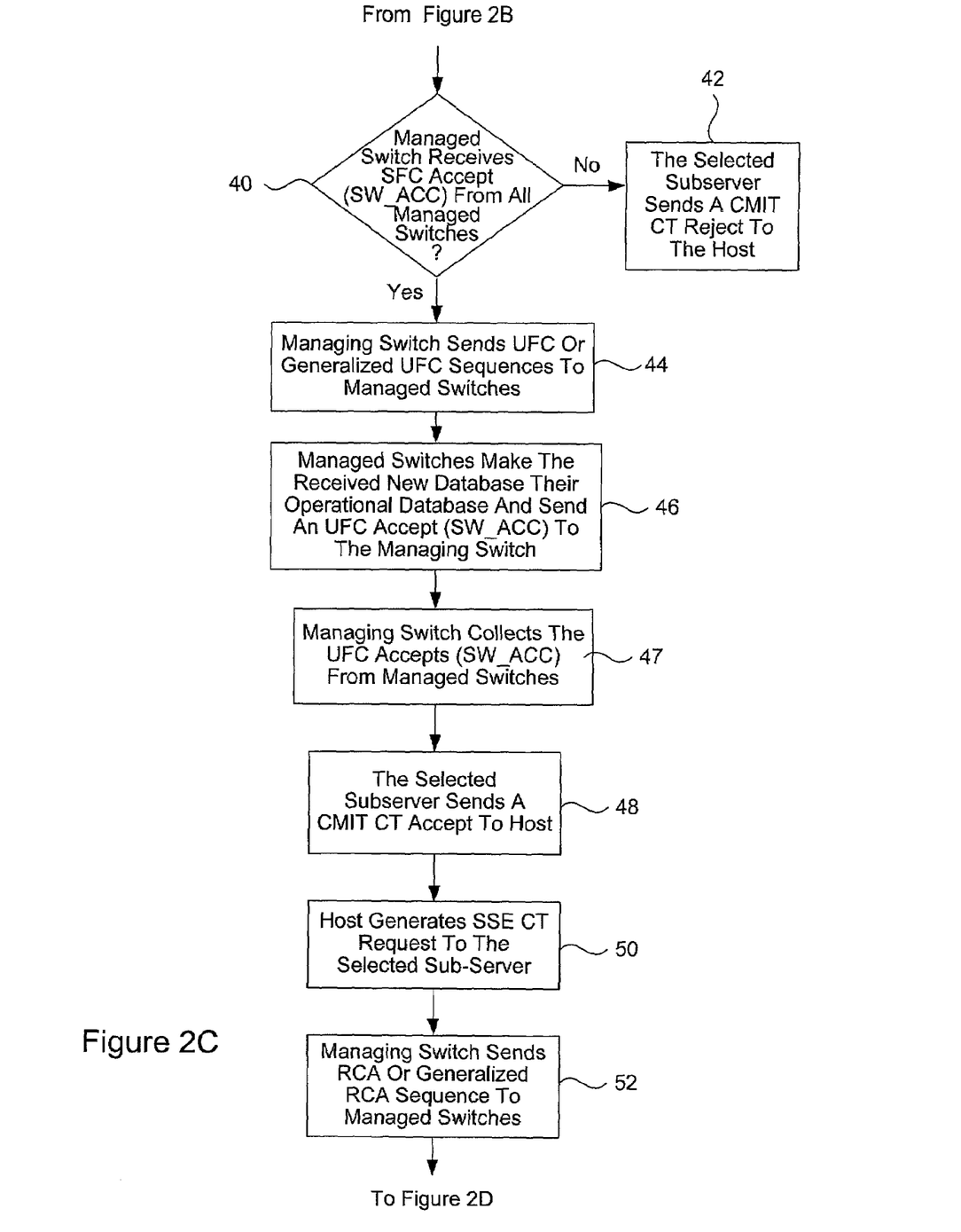

Referring to FIG. 2C, as depicted in decision diamond 40, the managing Switch collects the SFC accepts (SW_ACC) from the managed Switches. If one or more of the managed Switches do not generate an SFC accept sequence (SW_ACC), this means that the new database cannot be supported by the Fabric, and then the selected subserver residing over the managed Switch sends a CMIT CT reject command to the Host (box 42). On the other hand, if all the managed Switches issue an accept (SW_ACC) in response to the SFC sequence, this means that the new database can be supported by the Fabric. The managing Switch makes the new database its operational database and requests to the managed Switches to do the same by issuing the UFC sequence (box 44). In reply, the managed Switches make the received new database their operational database and send an UFC accept (SW_ACC) to the managing Switch (box 46). Thereafter, when the managing Switch collects all the UFC accept (SW_ACC) (box 47), the selected subserver residing over the managing Switch sends a CMIT CT accept to the Host (box 48). At this point the new database configuration has been distributed over the Fabric and the Host may end the process by releasing the lock over the Fabric or Service or subserver. The Host generates a Server Session End (SSE) CT request to the selected subserver (box 50), and then the managing Switch sends an RCA or a generalized RCA sequence to the managed Switches (box 52).

Figure 2D:
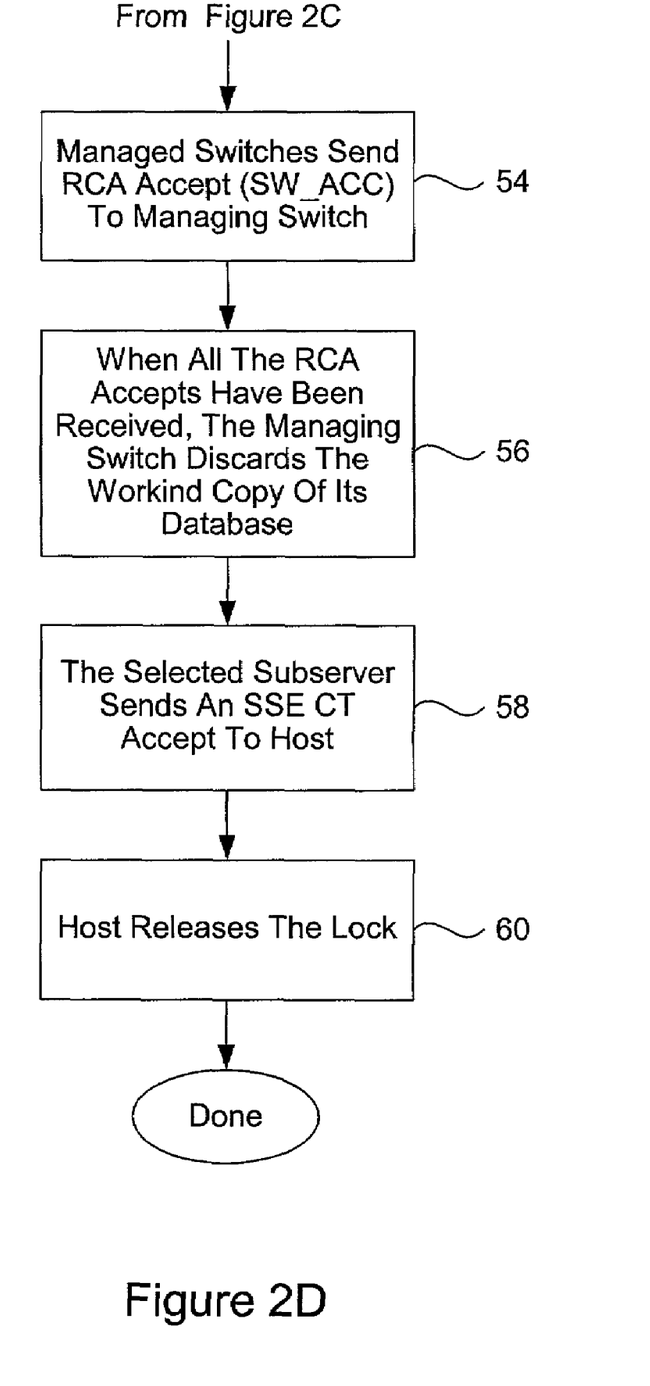

As depicted in FIG. 2D, the managed Switches send an RCA accept (SW_ACC) sequence to the managing Switch (box 54). When all the RCA accept (SW_ACC) sequences have been received, the managing Switch discards its working copy of the database (box 56), the selected subserver residing over the managing Switch issues an SSE CT accept to the Host (box 58) and in this manner the Host releases the lock (box 60).

Figure 3A:
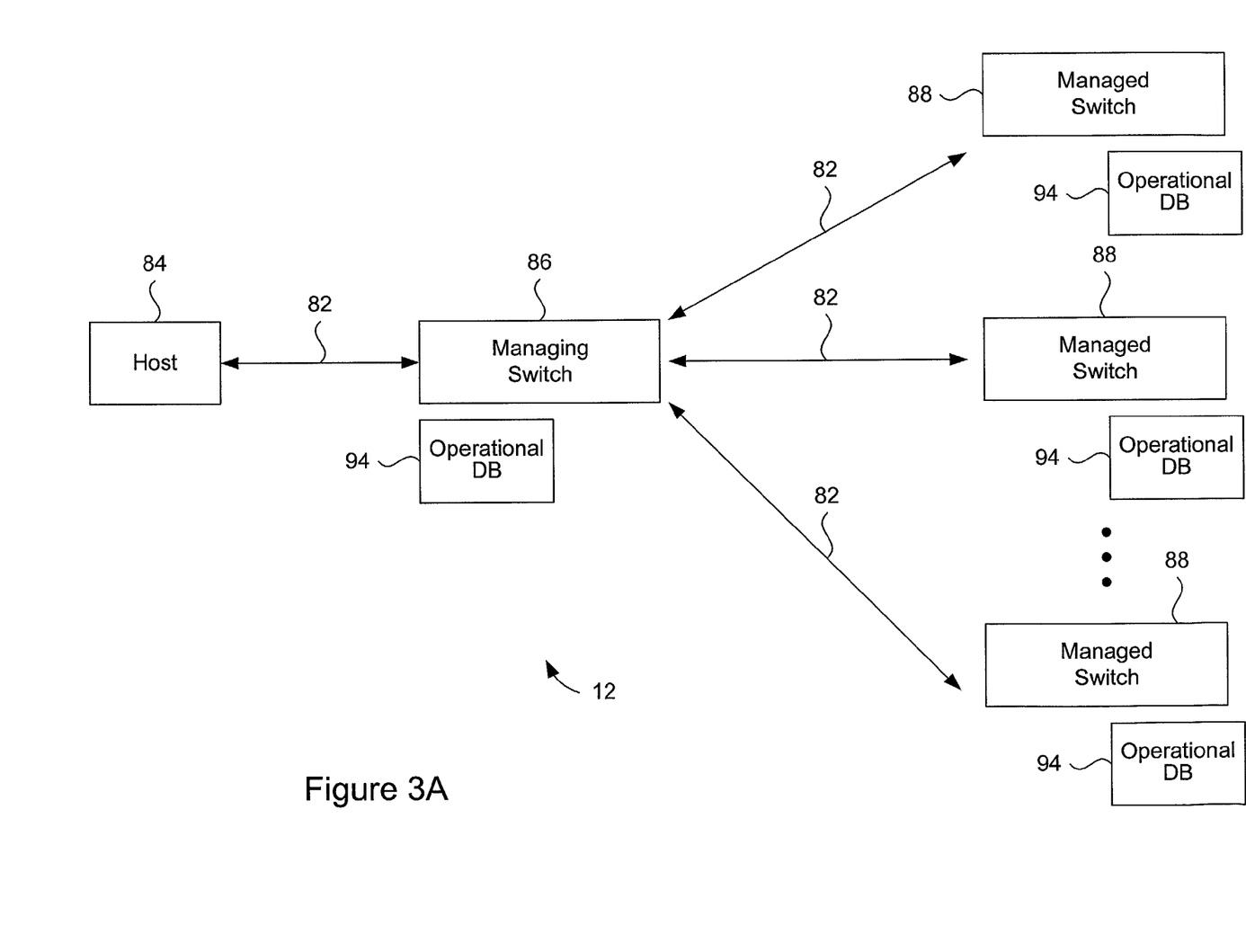
FIGS. 3A-3C are block diagrams illustrating the Switches of the Switching Fabric during implementation of the locking mechanism of the present invention.
Figure 3B:
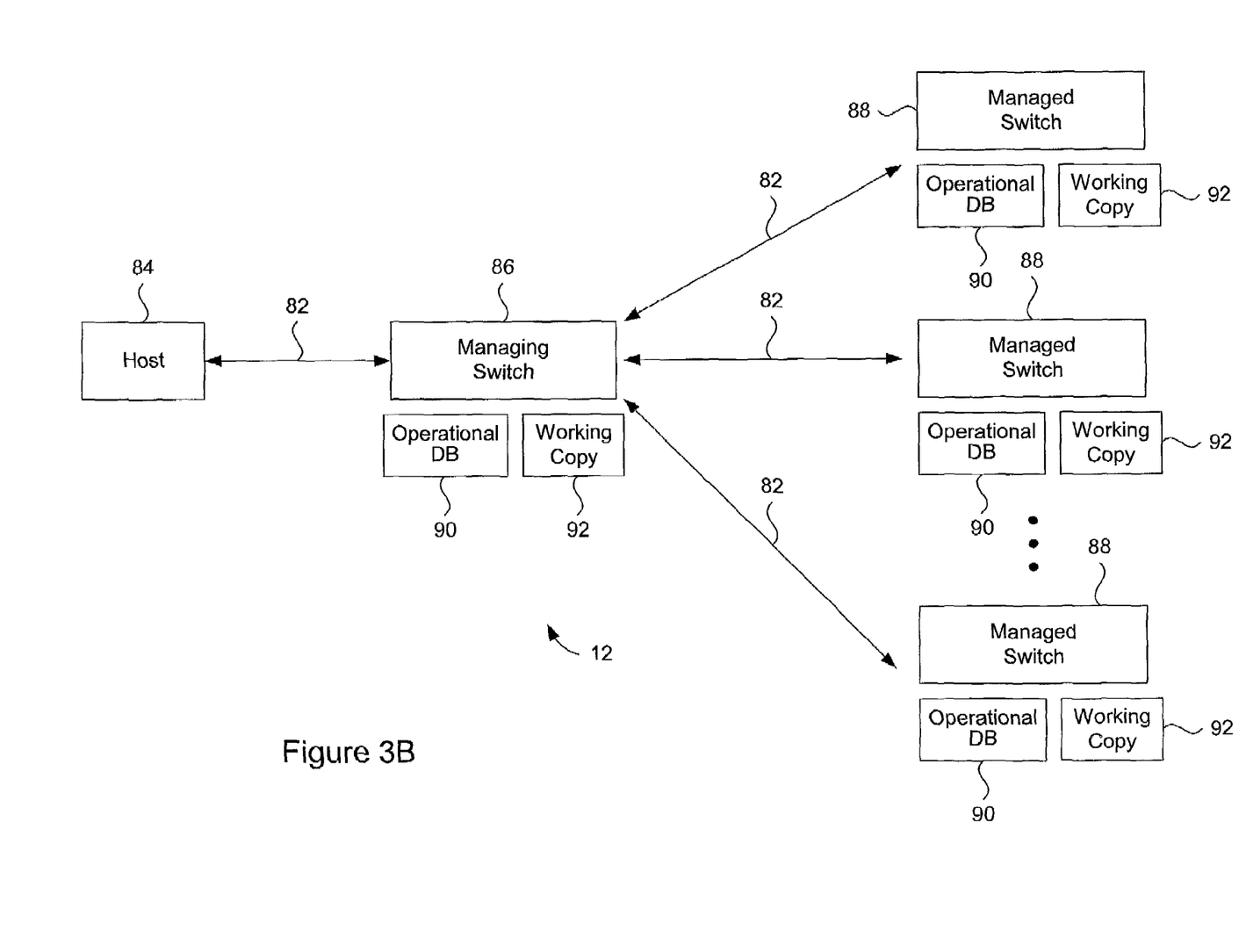
Figure 3C:
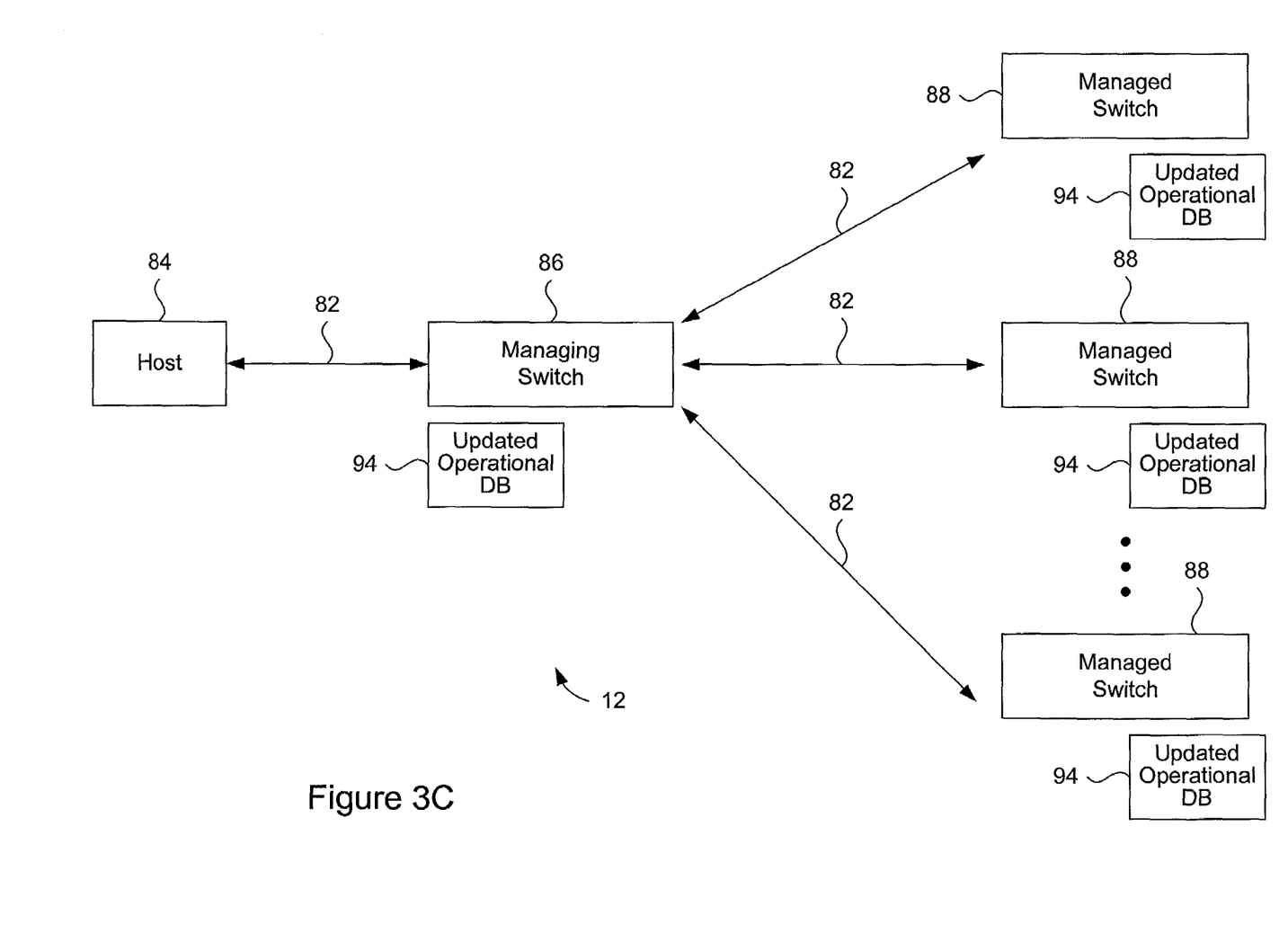

Referring to FIG. 3A, a block diagram of a Host and the Switches of the Switching Fabric 12 is shown. The double sided arrows 82 between the Host 84, the managing Switch 86, and the managed Switches 88 are representative of the various commands that are sent back and forth between these members during a locking session. Also noteworthy is the operational database 90 associated with each Switch. As illustrated in FIG. 3B, the managing Switch creates a working copy 92 of its operational database and distributes it over the Fabric during the session as discussed above. Once the changes have been implemented to the working copies 92 across the Fabric, the old operational databases 90 are discarded. The working copies 92 of the database then become the updated operational databases 94 when the Host issues a Commit CT request as illustrated in FIG. 3C.

It should be noted that the standard Fibre Channel Common Transport frames are used for the communication between the Hosts H and the Fabric 12 during a locking session as described above. For more information on the Fibre Channel Common Transport frames, see NCITS, Generic Services-3, Rev. 7.01, Nov. 28, 2000, incorporated by reference herein in its entirety for all purposes. See Specifically Section 4 entitled "Common Transport for Generic Services (CT)", pages 9 through 15 and Table 3.

The embodiments of the present invention described above are to be considered as illustrative and not restrictive. For example, the present invention does not necessarily have to be used with a Fibre Channel Fabric. It can also be used for example by a Switching Fabric relying on Fibre Channel over the Internet Protocol (FCIP) for example, or on Fibre Channel over any other technology. It can also be used by any type of storage area network where Hosts can not directly lock the Fabric of the network. Also, the various change commands described herein are only exemplary and any other types of commands may be used. The invention is not to be limited to the details given herein, but may be modified within the scope and equivalents of the appended claims.

What is claimed is:

1. An apparatus comprising:
   a network interface to send and receive Fibre Channel frames across the Fabric;
   a session element, responsive to the network interface, to establish sessions with the Fabric; and
   a locking element to issue commands to establish a lock over the Fabric so that replicated information across the Fabric can be consistently updated when the session element establishes a session with the Fabric.

2. The apparatus of claim 1, wherein the apparatus is a Switch included in the Fabric.

3. The apparatus of claim 2, wherein the locking element initiates a series of Switch-to-Switch commands to consistently update the replicated information across the Fabric.

4. The apparatus of claim 3, wherein the Switch-to-Switch commands include:
   an Acquire Change Authorization (ACA) command;
   a Stage Fabric Configuration (SFC) command;
   an Update Fabric Configuration (UFC) command; and
   a Release Change Authorization (RCA) command, all of them eventually generalized to convey information about a Service or subserver.

5. The apparatus of claim 2, wherein the Switch including the session element and the locking element is designated as a managing Switch while any other Switches in the Fabric behave as managed Switches when the Switch locks the Fabric.

6. The apparatus of claim 2, wherein the locking element of the Switch implements the management actions requested by an administrator through the Fibre Channel Generic Service protocol by issuing a series of Fibre Channel Common Transport (CT) requests during the session.

7. The apparatus of claim 1, wherein the replicated information includes the following types of information: zone databases, Fabric configuration databases, security service databases, authentication service databases, authorization service databases or any other management or configuration database.

8. The apparatus of claim 2, wherein the session element and the locking element of the Switch are implemented in one of the following implementations: software residing on the Switch, hardware residing on the Switch, or a combination of hardware and software residing on the Switch.

9. The apparatus of claim 1, wherein the apparatus is a Host connected to the Fabric.

10. The apparatus of claim 9, wherein the session element of the Host generates the Server Session Begin (SSB) and Server Session End (SSE) Common Transport (CT) requests to establish and end sessions with the Fabric when the Host wishes to lock and manage the Fabric.

11. The apparatus of claim 1, wherein the locking element further provides a lock of a specific Generic Service or a specific subserver within a Service that is applied across the Fabric during sessions with the Fabric so that management access to that specific Generic Service or specific subserver can be serialized, while concurrent sessions are allowed among different Services or subservers.

12. The apparatus of claim 1, wherein the Fabric relies on one of the following types of protocols for communication: Fibre Channel, or Fibre Channel over the Internet Protocol (FCIP) or Fibre Channel over any other technology.

13. An apparatus comprising:
a Switching Fabric including a plurality of Switches to selectively connect together a plurality of Hosts and storage devices; and
a locking mechanism available to the plurality of Hosts that enables one of the Hosts to lock the Switching Fabric when the one Host attempts to make a change to the Switching Fabric configuration.

14. The apparatus of claim 13, further comprising a consistency mechanism which enables the one Host to maintain consistency among a plurality of replicated entities associated with the plurality of Switches respectively.

15. The apparatus of claim 13, wherein the replicated entities include one of the following types of entities: zone databases, Fabric configuration databases, security service databases, authentication service databases, authorization service databases or any other type of management or configuration database.

16. The apparatus of claim 13, wherein the locking mechanism enables the one Host to view the Switching Fabric as a single logical entity.

17. The apparatus of claim 13, wherein the locking mechanism establishes a session between the one Host and the Switching Fabric when the locking mechanism is invoked by the one Host.

18. The apparatus of claim 17, wherein one Switch among the plurality of Switches is designated as a managing Switch and the remainder of the Switches are designated as managed Switches during the session, the managing Switch issues a set of Switch-to-Switch commands to implement the changes to the Switching Fabric as requested by the one Host that invoked the session and locking mechanism.

19. The apparatus of claim 18, wherein the Switch-to-Switch commands include:
an Acquire Change Authorization (ACA) command;
a Stage Fabric Configuration (SFC) command;
an Update Fabric Configuration (UFC) command; and
a Release Change Authorization (RCA) command, all of them eventually generalized to convey information about a Service or subserver.

20. The apparatus of claim 13, wherein the locking mechanism resides on a selected Switch selected among the plurality of Switches.

21. The apparatus of claim 20, wherein the selected Switch is further handles CT session requests (Server Session Begin and Server Session End) issued by the one Host.

22. The apparatus of claim 21, wherein the selected Switch is designated as a managing Switch and the remainder of the plurality of Switches are designated as managed Switches when the locking mechanism is invoked on the selected Switch.

23. The apparatus of claim 21, wherein the session requests are conveyed over the Common Transport protocol.

24. The apparatus of claim 23, wherein the Common Transport protocol is implemented in one of the following types of implementations: hardware, software, or a combination of hardware and software.

25. The apparatus of claim 13, wherein the Switching Fabric relies on one of the following types of protocols for communication: Fibre Channel, or Fibre Channel over the Internet Protocol (FCIP) or Fibre Channel over any other technology.

26. A method, comprising:
establishing a session between the Host and the Fabric;
sending change requests from the Host to the Fabric after the session is established;
distributing the changes across the Switches of the Fabric; and
terminating the session after the changes have been distributed across the Fabric.

27. The method of claim 26, wherein the session is established with a specific subserver of a Service.

28. The method of claim 27, wherein the change requests are sent from the Host to the Fabric using Common Transport (CT) frames.

29. The method of claim 26, wherein the requested changes are distributed across the Fabric using a series of Switch-to-Switch commands.

30. The method of claim 26, further comprising determining if the Switches of the Fabric can support the requested changes before applying the changes across the Fabric.

31. The method of claim 26, wherein the establishing a session between the Host and the Fabric further comprises establishing the session between the Host and the Fabric through a selected one of the Switches of the Fabric.

32. The method of claim 31, wherein the selected one Switch becomes a managing Switch and the other Switches in the Fabric behave as managed Switches during the session.

33. The method of claim 26, wherein the changes are distributed across the Switches of the Fabric when the Host issues a Commit CT request.

34. The method of claim 26, wherein the Switching Fabric relies on one of the following types of protocols for communication: Fibre Channel, or Fibre Channel over the Internet Protocol (FCIP) or Fibre Channel over any other technology.

* * * * *

UNITED STATES PATENT AND TRADEMARK OFFICE
CERTIFICATE OF CORRECTION

| | | |
|---|---|---|
| PATENT NO. | : 7,656,884 B1 | Page 1 of 1 |
| APPLICATION NO. | : 10/155919 | |
| DATED | : February 2, 2010 | |
| INVENTOR(S) | : Claudio DeSanti | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2301 days.

Signed and Sealed this

Twenty-eighth Day of December, 2010

David J. Kappos
*Director of the United States Patent and Trademark Office*